(12) United States Patent
Puthillathe et al.

(10) Patent No.: US 11,847,082 B2
(45) Date of Patent: Dec. 19, 2023

(54) SYSTEM AND METHOD FOR SECURE MANAGEMENT OF NON-REGISTERED COMPONENTS OF AN INFORMATION HANDLING SYSTEM USING A BASEBOARD MANAGEMENT CONTROLLER

(71) Applicant: Dell Products, L.P., Round Rock, TX (US)

(72) Inventors: Chandrasekhar Puthillathe, Bangalore (IN); Chitrak Gupta, Bangalore (IN); Raghavendra Venkataramudu, Bangalore (IN); Chinmay Shripad Hegde, Uttara Kannada (IN); Anurag Sharma, Cedar Park, TX (US); Rajib Saha, Bangalore (IN); Jitendra Kumar Rath, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 258 days.

(21) Appl. No.: 17/069,161

(22) Filed: Oct. 13, 2020

(65) Prior Publication Data

US 2022/0114027 A1 Apr. 14, 2022

(51) Int. Cl.
*G06F 15/16* (2006.01)
*G06F 13/38* (2006.01)
(Continued)

(52) U.S. Cl.
CPC .......... *G06F 13/387* (2013.01); *H04L 67/565* (2022.05); *H04L 41/12* (2013.01)

(58) Field of Classification Search
CPC ..... G06F 13/387; G06F 9/541; H04L 67/565; H04L 41/12

(Continued)

(56) References Cited

U.S. PATENT DOCUMENTS 6,754,817 B2 * 6/2004 Khatri .................. G06F 9/4411
713/1
7,487,345 B2 * 2/2009 Khatri ...................... G06F 8/65
713/100
(Continued)

FOREIGN PATENT DOCUMENTS

CN 109254922 A * 1/2019 .......... G06F 11/3672
CN 109639803 A * 4/2019 .......... G06F 9/45558

OTHER PUBLICATIONS

Redfish Scalable Platforms Management API Specification, DMTF Redfish, May 21, 2017, 2014-2017 Distributed Management Task Force, Inc. (DMTF), Document Identifier: DSP0266, v. 1.2.0. (Year: 2017).*

*Primary Examiner* — Moustafa M Meky
*Assistant Examiner* — Thorne E Waugh
(74) *Attorney, Agent, or Firm* — Fogarty LLP (57) ABSTRACT

An Information Handling System (IHS) includes multiple hardware devices, and a Baseboard Management Controller (BMC) in communication with the hardware devices. The BMC includes executable code to cause the BMC to receive a message associated with a non-registered hardware device that is not registered to be managed by the BMC in which the message formatted according to a native protocol of the BMC. The code further causes the code to transmit the message to a device plugin associated with the non-registered hardware device in which the device plugin comprises custom instructions that, upon execution by a system processor, cause the IHS to convert the message into a protocol associated with the non-registered hardware device, and forward the converted message to the non-registered hardware device using the protocol of the non-registered hardware device.

20 Claims, 7 Drawing Sheets

(51) Int. Cl.
*H04L 67/565* (2022.01)
*H04L 41/12* (2022.01)

(58) Field of Classification Search
USPC .......................................................... 709/224
See application file for complete search history.

(56) References Cited

U.S. PATENT DOCUMENTS

| | | | |
|---|---|---|---|
| 2007/0260896 A1* | 11/2007 | Brundridge | G06F 1/32 713/300 |
| 2015/0355651 A1* | 12/2015 | Balakrishnan | G06F 9/442 700/299 |
| 2019/0004901 A1* | 1/2019 | Ryan | G06F 1/3253 |
| 2019/0026125 A1* | 1/2019 | Preimesberger | G06F 9/44505 |
| 2019/0087182 A1* | 3/2019 | Thomas | H04L 41/04 |
| 2019/0095377 A1* | 3/2019 | Brown | G06F 13/4286 |
| 2019/0138360 A1* | 5/2019 | Devireddy | G06F 9/5044 |
| 2019/0319868 A1* | 10/2019 | Svennebring | H04L 41/147 |
| 2020/0311008 A1* | 10/2020 | Saha | G06F 3/067 |
| 2021/0240497 A1* | 8/2021 | Thulasi | G06F 9/546 |
| 2021/0303286 A1* | 9/2021 | Van Heuklon | G06F 11/3093 |
| 2021/0397577 A1* | 12/2021 | Kahn | H04L 67/1097 |
| 2021/0405097 A1* | 12/2021 | Campbell | G01R 22/063 |
| 2022/0100421 A1* | 3/2022 | Huang | G06F 13/4282 |

* cited by examiner

SYSTEM AND METHOD FOR SECURE MANAGEMENT OF NON-REGISTERED COMPONENTS OF AN INFORMATION HANDLING SYSTEM USING A BASEBOARD MANAGEMENT CONTROLLER

FIELD

The present disclosure generally relates to electronics, and, more particularly, to systems and methods for secure management of non-registered components of an information handling system (IHS) using a Baseboard Management controller (BMC).

BACKGROUND

As the value and use of information continues to increase, individuals and businesses seek additional ways to process and store information. One option available to users is information handling systems to be general or configured for a specific user or specific use such as financial transaction processing, airline reservations, enterprise data storage, or other systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information aware communications. In addition, information handling systems may include a variety of hardware and software components that may be configured to process, store, and communicate information and may include one or more computer systems, data storage systems, and networking systems.

In modern day IHSs, administrative management is often provided via Baseboard Management controllers (BMCs). The baseboard management controller (BMC) generally includes a specialized microcontroller embedded on the motherboard of the IHS, and provides an interface between system-management software and platform hardware. Different types of sensors built into the IHS report to the BMC on parameters such as temperature, cooling fan speeds, power status, operating system (OS) status, and the like. The BMC monitors the sensors and can send alerts to a system administrator via the network if any of the parameters do not stay within pre-set limits, indicating a potential failure of the system. The administrator can also remotely communicate with the BMC to take some corrective actions—such as resetting or power cycling the system to get a hung OS running again. These abilities save on the total cost of ownership of an IHS.

SUMMARY

An Information Handling System (IHS) includes multiple hardware devices, and a Baseboard Management Controller (BMC) in communication with the hardware devices. The BMC includes executable code to cause the BMC to receive a message associated with a non-registered hardware device that is not registered to be managed by the BMC in which the message is formatted according to a native protocol of the BMC. The code further causes the BMC to transmit the message to a device plugin associated with the non-registered hardware device in which the device plugin comprises custom instructions that, upon execution by a system processor, cause the IHS to convert the message into a protocol associated with the non-registered hardware device, and forward the converted message to the non-registered hardware device using the protocol of the non-registered hardware device.

According to another embodiment, a method includes receiving, and using executable instructions executed by at least one processor, a message associated with a non-registered hardware device that is not registered to be managed by a Baseboard Management Controller (BMC) in which the message is formatted according to a native protocol of the BMC. The BMC is in communication with multiple of the hardware devices. The method further comprises transmitting the message to a device plugin associated with the non-registered hardware device in which the device plugin comprises custom instructions that, upon execution by a system processor, cause the IHS to convert the message into a protocol associated with the non-registered hardware device, and forward the converted message to the non-registered hardware device using the protocol of the non-registered hardware device.

According to yet another embodiment, one or more computer-readable storage devices have instructions stored thereon for providing remote management of an IHS (Information Handling System) using a BMC. Execution of the instructions cause the BMC to receive a message associated with a non-registered hardware device that is not registered to be managed by a Baseboard Management Controller (BMC) in which the message is formatted according to a native protocol of the BMC. Execution of the instructions also causes the BMC to transmit the message to a device plugin associated with the non-registered hardware device in which the device plugin comprises custom instructions that, upon execution by a system processor, cause the IHS to convert the message into a protocol associated with the non-registered hardware device, and forward the converted message to the non-registered hardware device using the protocol of the non-registered hardware device.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein comprise systems and methods for secure management of non-registered hardware devices 206 of an information handling system (IHS) using a Baseboard Management controller (BMC). Whereas conventional BMC implementations do not possess any technique for defining actions performed on non-registered hardware devices 206 of an IHS, management of the overall health of the IHS has heretofore remained a challenging endeavor. Embodiments of the present disclosure provide a solution to this problem by enabling management of non-registered hardware devices 206 via the use of plugins, which can be customized to suit the schema and/or communication protocol(s) used by the non-registered hardware devices 206 of an IHS. Additionally, the customized plugins can be utilized to provide parametric monitoring and reporting of those non-registered hardware devices using the BMC.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), network storage device, or any other suitable device and may vary in size, shape, performance, functionality, and price.

The IHS may include random access memory (RAM), one or more processing resources such as a central processing unit (CPU) or hardware or software control logic, read only memory (ROM), and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 1:
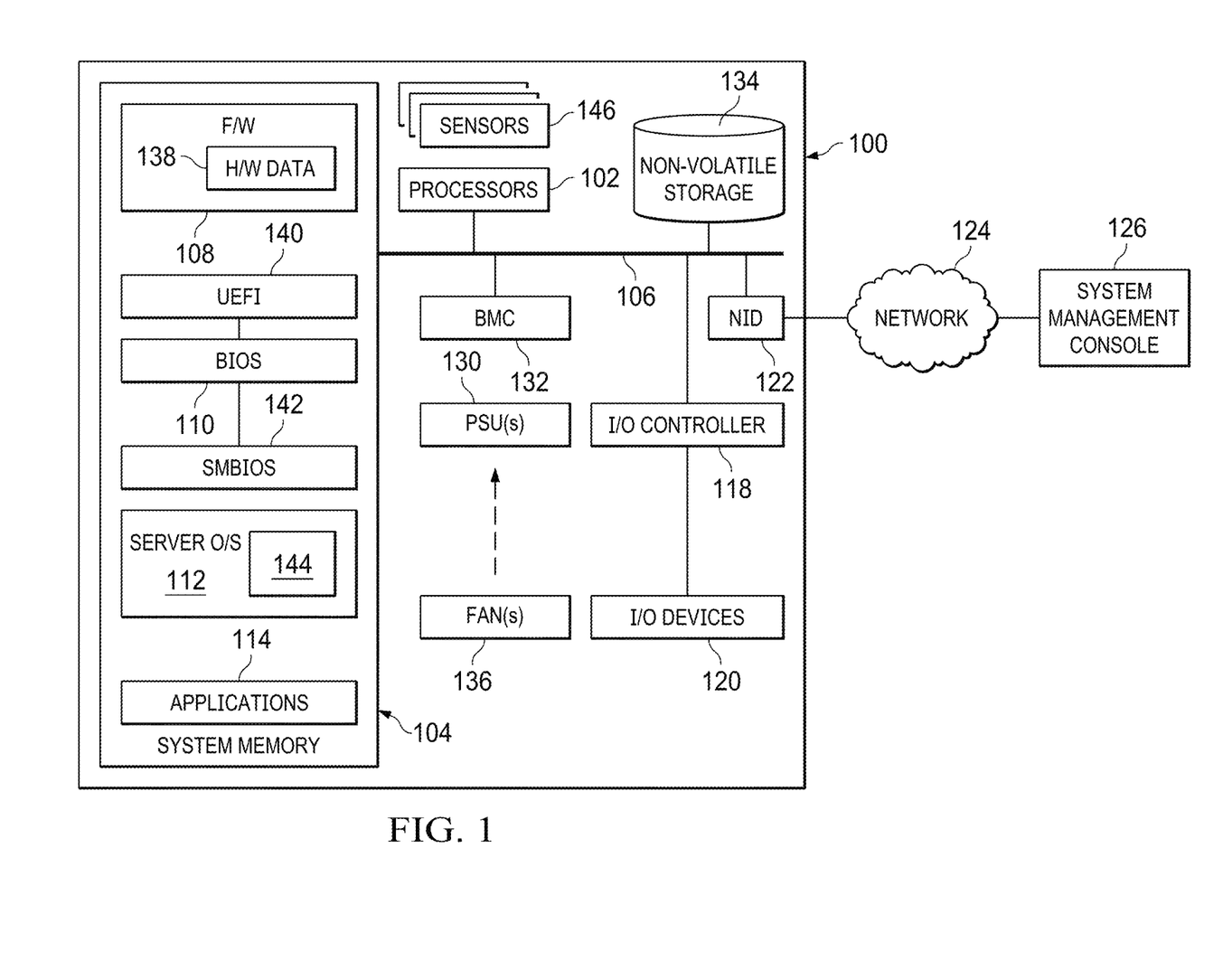
FIG. 1 is a block diagram of examples of several hardware devices of an Information Handling System (IHS), according to one embodiment of the present disclosure.

FIG. 1 is a block diagram of examples of several hardware devices of an Information Handling System (IHS), according to one embodiment of the present disclosure. Particularly, IHS 100 includes one or more processor(s) 102 coupled to system memory 104 via system interconnect 106. System interconnect 106 may include any suitable system bus. System memory 104 may include multiple software and/or firmware modules including firmware (F/W) 108, basic input/output system (BIOS) 110, server operating system (OS) 112, and/or application(s) 114. Software and/or firmware module(s) stored within system memory 104 may be loaded into processor(s) 102 and executed during operation of IHS 100.

F/W 108 may include hardware device data 138 that is used to store information associated with certain hardware devices (e.g., processor(s) 102, system memory 104, non-volatile storage 134, NID 122, I/O controllers 118, power supply unit(s) 130, Fan(s) 136, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of IHS 100. This feature can eliminate the need for the operating system to probe hardware directly to discover what devices are present in the computer.

IHS 100 includes one or more input/output (I/O) controllers 118 which support connection by and processing of signals from one or more connected input/output (I/O) device(s) 120, such as a keyboard, a mouse, a touch screen, a microphone, a monitor or a display device, a camera, a microphone, audio speaker(s) (not shown), an optical reader, a universal serial bus (USB), a card reader, a Personal Computer Memory Card International Association (PCMCIA) slot, and/or a high-definition multimedia interface (HDMI), may be included or coupled to IHS 100.

IHS 100 also includes a Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more PSUs 130. PSUs 130 power the hardware devices of IHS 100 (e.g., processor(s) 102, system memory 104, non-volatile storage 134, NID 122, I/O controllers 118, I/O devices 120, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may include a baseboard processor, or other microcontroller, that operates management software for supporting remote monitoring and administration of IHS 100. BMC 132 may be installed on the motherboard of IHS 200 or may be coupled to IHS 100 via an expansion slot provided by the motherboard. In support of remote monitoring functions, NID 122 may support connections with BMC 132 using wired and/or wireless network connections via a variety of network technologies. In other embodiments, BMC 132 may include or may be an integral part of a Chassis Management Controller (CMC). As a non-limiting example, the BMC 132 may include an integrated Dell Remote Access Controller (iDRAC) from Dell® embedded within Dell PowerEdge™ servers. The iDRAC provides functionality that helps information technology (IT) administrators deploy, update, monitor, and maintain servers remotely, such as via system management console 126. Additionally, the server O/S 112 may include a BMC service module 144 that interfaces with BMC 132 to perform, among other things, managing the hardware devices of IHS 100 from the O/S 112 using in-band management connection. BMC service module 144 will be discussed in detail herein below.

BMC 132 may be configured to provide out-of-band management facilities for IHS 100. Management operations may be performed by BMC 132 even if IHS 100 is powered off, or powered down to a standby state. BMC 132 may include an out-of-band network interface separate from and physically isolated from an in-band network interface of IHS 100, and/or other embedded resources. In one embodiment, BMC 132 may support monitoring and administration of the hardware devices of IHS 100 via a sideband bus interface, such as an I2C sideband bus that may be individually established with some, most, or all of the respective hardware devices.

In many cases, the hardware devices configured on a typical IHS 100 are registered in its firmware 108. In such cases, firmware 108 may be accessed to obtain the hardware device data 138 for those hardware devices registered in its BIOS 110. Hardware device data 138 generally refers to any information that may be used to manage its associated hardware device (e.g., acquire parametric data, change its configuration, etc.). For any non-registered (unsupported/unqualified) hardware device, however, its hardware device data may be unknown. That is, no data or insufficient data for that non-registered hardware device 206 may be available in BIOS 110. In such situations, BMC 132 may not be able to obtain appropriate hardware device data for managing that device.

For each device configured in IHS 100, a model should be established and modeled (enrolled) in BMC 132. In a particular embodiment involving an iDRAC, a resource metadata file should be established and modeled in the iDRAC. The resource metadata file generally includes information associated with a particular hardware device that enables its management by BMC 132.

Furthermore, for each non-registered hardware device 206 added and modeled in BMC 132, the configuration actions and the path to enable them should be defined. Nevertheless, there has heretofore been no technique for defining non-registered hardware device actions and mapping them to existing resources. Additionally, there has been no technique for exposing those non-registered hardware device actions through a user interface (e.g., system management console 126), such as via standard RESTful interface (e.g., Redfish) definitions.

Figure 2:
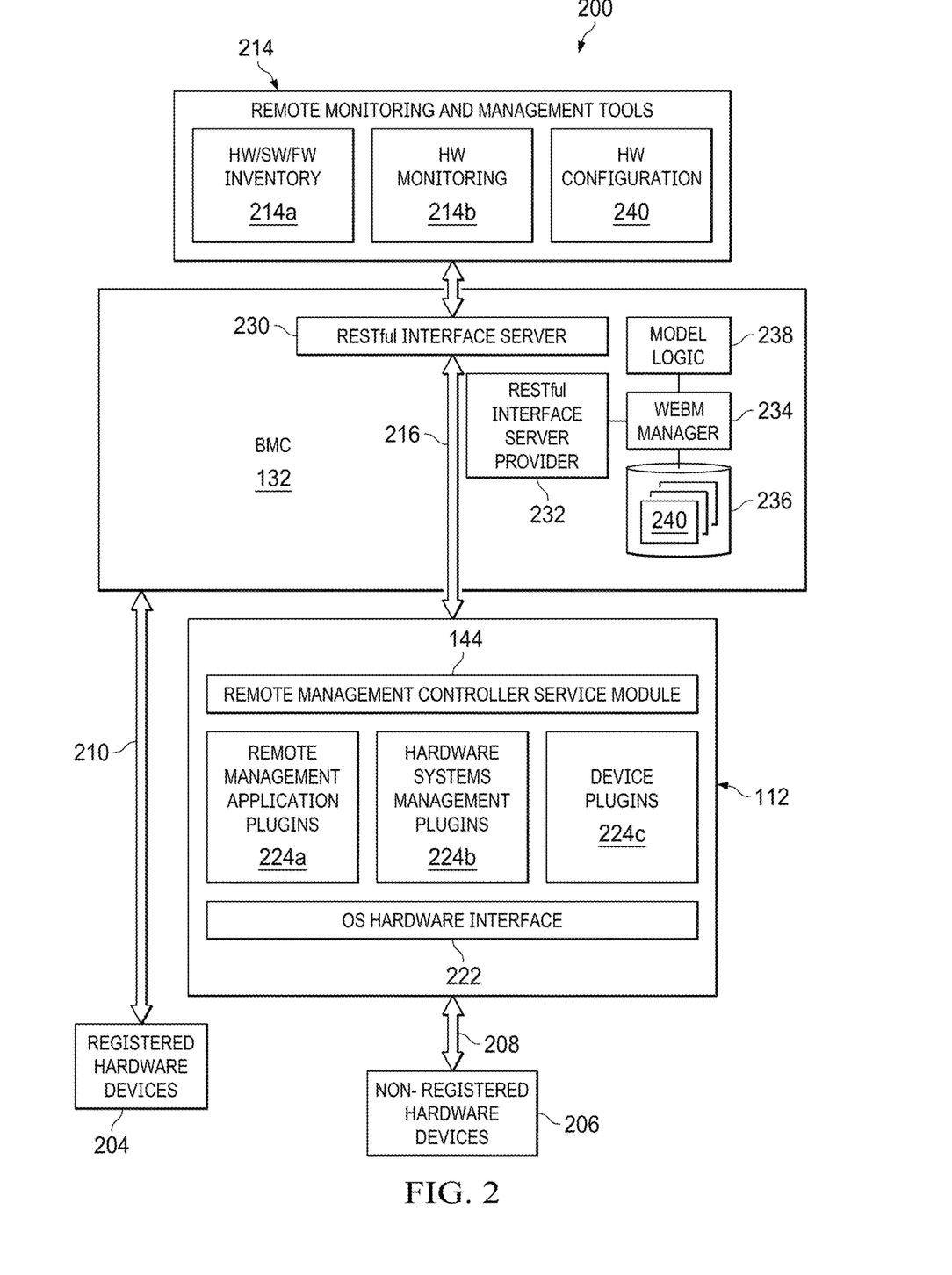
FIG. 2 illustrates an example non-registered hardware device management system according to one embodiment of the present disclosure.

FIG. 2 illustrates an example non-registered hardware device management system 200 according to one embodiment of the present disclosure. According to embodiments of the present disclosure, an IHS 100, such as described above with reference to FIG. 1, may include one or more registered hardware devices 204, and one or more non-registered hardware devices 206. For example, IHS 100 may be configured with a newly available hardware device for which no hardware device data has yet been added to hardware device data 138. System 200 may include an operating system 112 of IHS 100 that interfaces with certain non-registered hardware devices 206 over an in-band management interface 208, such as supported by the IHS. The system 200 also includes a BMC 132 that interfaces with the registered hardware devices 204 over a sideband management interface 210. For example, sideband management interface 210 may include an I2C sideband bus that communicates with individual registered hardware devices 204 using endpoint modules referred to as modular field replaceable units (FRUs).

As described above, BMC 132 may be a component of an IHS that operates independently of O/S 112, and provides remote monitoring and management of various hardware devices of an IHS, where it interfaces with the managed devices via sideband management connections 210 that are independent of the operating system 112. BMC 132 may support remote management of the managed devices of an IHS via a set of remote monitoring and management tools 214. Such remote tools 214 may provide an administrator with various capabilities for remotely investigating, diagnosing and administering the operation of an IHS.

For example, the remote tools 214 may include an inventory 214a of the hardware, software and firmware of an IHS that are being remotely managed through the operation of BMC 132. The remote tools 214 may also include various monitoring interfaces 214b for evaluating telemetry data collected by the BMC 132. The remote tools 214 may also include configuration information 214c for some or all of the hardware components that are being managed. In some embodiments, such remote monitoring and management tools 214 may interface with a BMC 132 using a RESTful interface server 230, such as a RESTful (e.g., Redfish) remote management interface. These remote monitoring and management capabilities may rely on classifications of the hardware devices that are being managed. For instance, a hardware component classified as a networking component may be managed using tools that characterize the network traffic that is being processed by that component. A hardware component that is classified as a cryptographic component may be managed using different tools that characterize the cryptographic operations that are performed by the component.

In implementing the monitoring and management operations, the BMC 132 may collect information from the managed component directly via the sideband management interface 210, and may also collect information indirectly from the operating system 112 via an in-band management connection 216. As illustrated, the operating system 112 may include a BMC service module 144 that interfaces with the BMC 132. In various embodiments the BMC service module 144 may rely on various modules that operate within the operating system 112 in order to interface with non-registered hardware devices 206 via hardware interfaces 222 that are supported by the operating system 112. Such modules may include remote management application plug-ins 224a that implement specific remote management capabilities, such as data collection in support of specific remote management tools. These modules may also include hardware systems management plugins 224b that collect system-level hardware information, such as environmental and physical security sensor data. The modules may also include device plugins 224c that specialize in collecting telemetry data from specific hardware devices and/or specific types of hardware devices. As will be described in detail herein below, device plugins 224c may be provided as a means for management of non-registered hardware devices 206 in which each device plugin 224c may be developed with customized logic and hardware device data that is specific to each non-registered hardware device 206. In one embodiment, each device plugin 224c may expose a common or otherwise standardized interface (e.g., software development kit (SDK)) to device plugin 224c so that new device plugins 224c can be easily added, deleted, and/or modified by a user at SDK developer console 4xx in a structured manner.

As shown, BMC 132 is configured with a RESTful interface server 230 that may present a user interface (e.g., HW/SW/FW Inventory 214a, HW monitoring 214b, HW configuration 214c, etc.) to a user via system management console 126. Additionally, BMC 132 is configured with a Web-Based Enterprise Management (WBEM) tool including a RESTful interface server provider 232, a WBEM manager 234, a resource database 236, and model logic 238 for storing and managing actions performed on non-registered hardware devices 206 from BMC 132. The WBEM tool may be beneficial for, among other things, providing a unified interface for managing computing resources distributed in a communication network, such as BMC service module 144, which communicates with BMC 132 using an HTTP, version 2 communication link. In one embodiment, WBEM tool may conform to a Common Management Programming Interface (CMPI) standard. The CMPI may be particularly beneficial due to its interoperability with various programming interfaces in some embodiments. That is, the WBEM tool conforming to the CMPI standard may be agnostic to any one of multiple programming interfaces, such as OpenWBEM, OpenPegasus, C++ API, and the like.

For non-registered hardware devices 206, their actions may conform to an industry standards organization, such as a Distributed Management Task Force (DMTF) industry standards organization. As such, the actions modeled by a registration record 240 stored in resource database 236 may use model logic 238 to obtain information for performing the industry standards organization based action. Nevertheless, cases exist where a non-registered hardware device 206 operates certain actions that do not conform to an industry standards organization. Because the DMTF schema allows OEM extensions for non-standard actions, embodiments of the present disclosure may use (leverage) those OEM extensions where possible. For such actions, the information about the action and parameters may be provided to BMC 132. The information stored in BMC 132 will then be invoked by a non-registered hardware device 206 (e.g., a consuming client) at runtime. The non-registered hardware device actions, however, will be redirected to the device plugin 224c through BMC service module 144 after an internal look up as an event. The device plugin 224c manages the action by performing the configuration on the non-registered hardware device 206, and sending a response to the action back to the RESTful interface 230.

RESTful interface server provider 232 forwards messages associated with an action between WBEM manager 234 and RESTful interface server 230. Resource database 236 stores registration records 240 generated by one or more device plugins 224c configured on BMC service module 144, while model logic 238 stores logic for implementing the actions of the non-registered hardware devices 206 in IHS 100, and WBEM manager 234 manages how the actions are administered on the non-registered hardware devices 206 in IHS 100. BMC service module 144, which is implemented in the O/S 112 of IHS 100, includes a RESTful interface client for communicating with RESTful interface server 230 configured on BMC 132. That is, the RESTful interface client communicates with RESTful interface server 230 to convey messages transferred between WBEM manager 234 and device plugin 224c.

Figure 3:
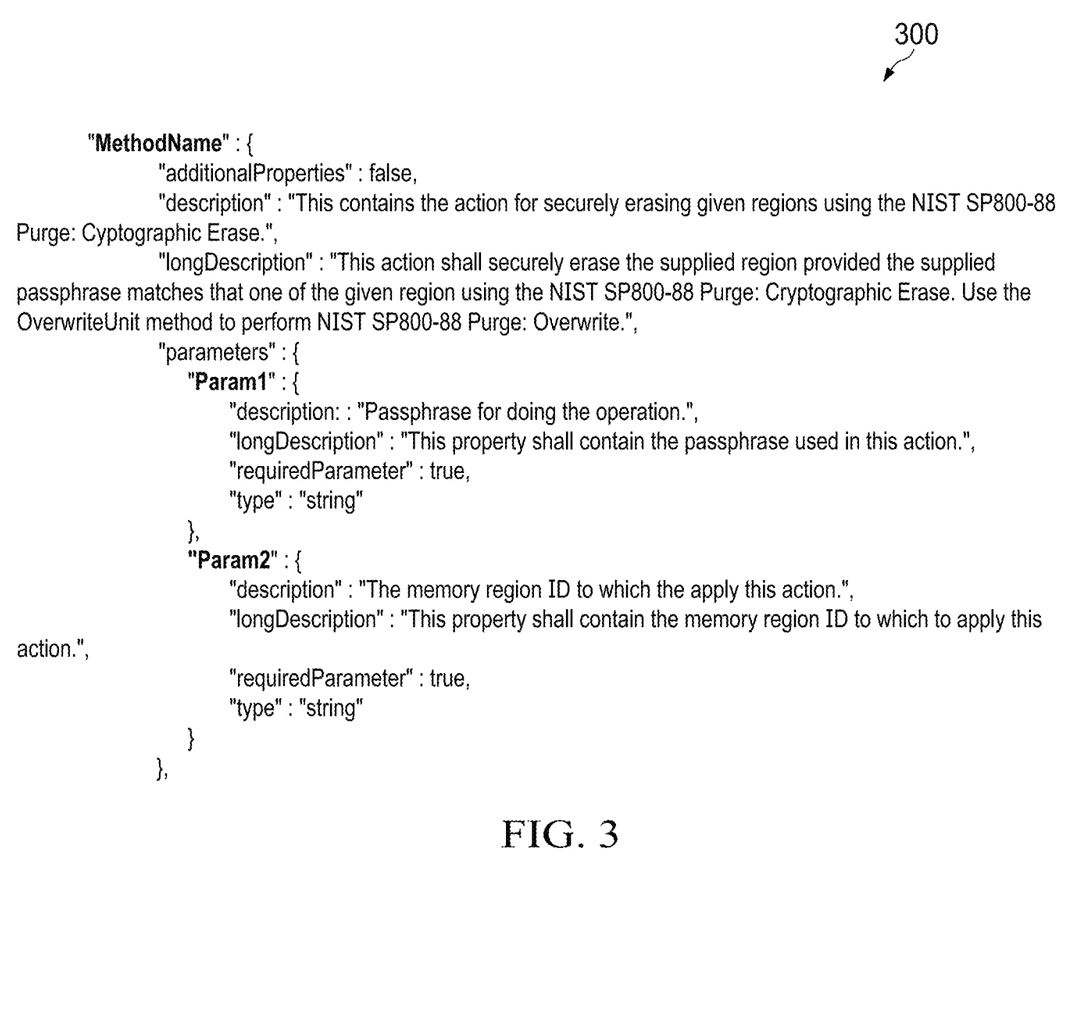
FIG. 3 illustrates an example action that can be executed at the BMC, which in turn, get propogated to a plugin via the host O/S according to one embodiment of the present disclosure.

FIG. 3 illustrates an example action that can be executed at BMC 132, which in turn, gets propagated to plugin 224c via host O/S 112 according to according to one embodiment of the present disclosure. In general, a user, such as a plugin developer, will define the device schema which will model the device properties and the device actions of the non-registered hardware device 206 given the structure shown to form the registration record 240. Once formed, the registration record (e.g., registration bundle) will be registered in the memory of BMC 132 by the device plugin 224c.

As shown, the action 300 is arranged in a structured form for storing certain parameters associated with allowed actions that may be performed by its associated non-registered hardware device 206, and for storing other parameters associated with how those actions may be performed. The action 300 as shown includes certain fields, such as a 'MethodName' field, an 'additionalProperties' field, a 'description' field, a 'longDescription' field, and one or more parameter fields for describing how it (the action) is to be performed. Nevertheless, it should be appreciated that the action 300 may include any quantity and number of parameters without deviating from the spirit and scope of the present disclosure.

Action 300 may include metadata information, such as allowed HTTP operations, method name, method input and output parameters of non-registered hardware device actions stored in model logic 238 and resource database 236 as WBEM (e.g., CMPI) objects. This stored information allows RESTful interface provider 232 to identify allowed operations on the non-registered hardware devices 206 and validate those parameters associated with the allowed actions. In one embodiment, RESTful interface provider 232 identifies the target hardware device, including whether or not it is a non-registered hardware device 206, based on an identity (e.g., FQDD) of the device. Once identified, messages used to perform the actions on non-registered hardware devices 206 may be forwarded to BMC service module 144 over a sideband management channel 216. In one embodiment, sideband management channel 216 may include a HTTP, version 2 channel. Details associated with the HTTP, version 2 channel will be described more fully herein below.

Figure 4:
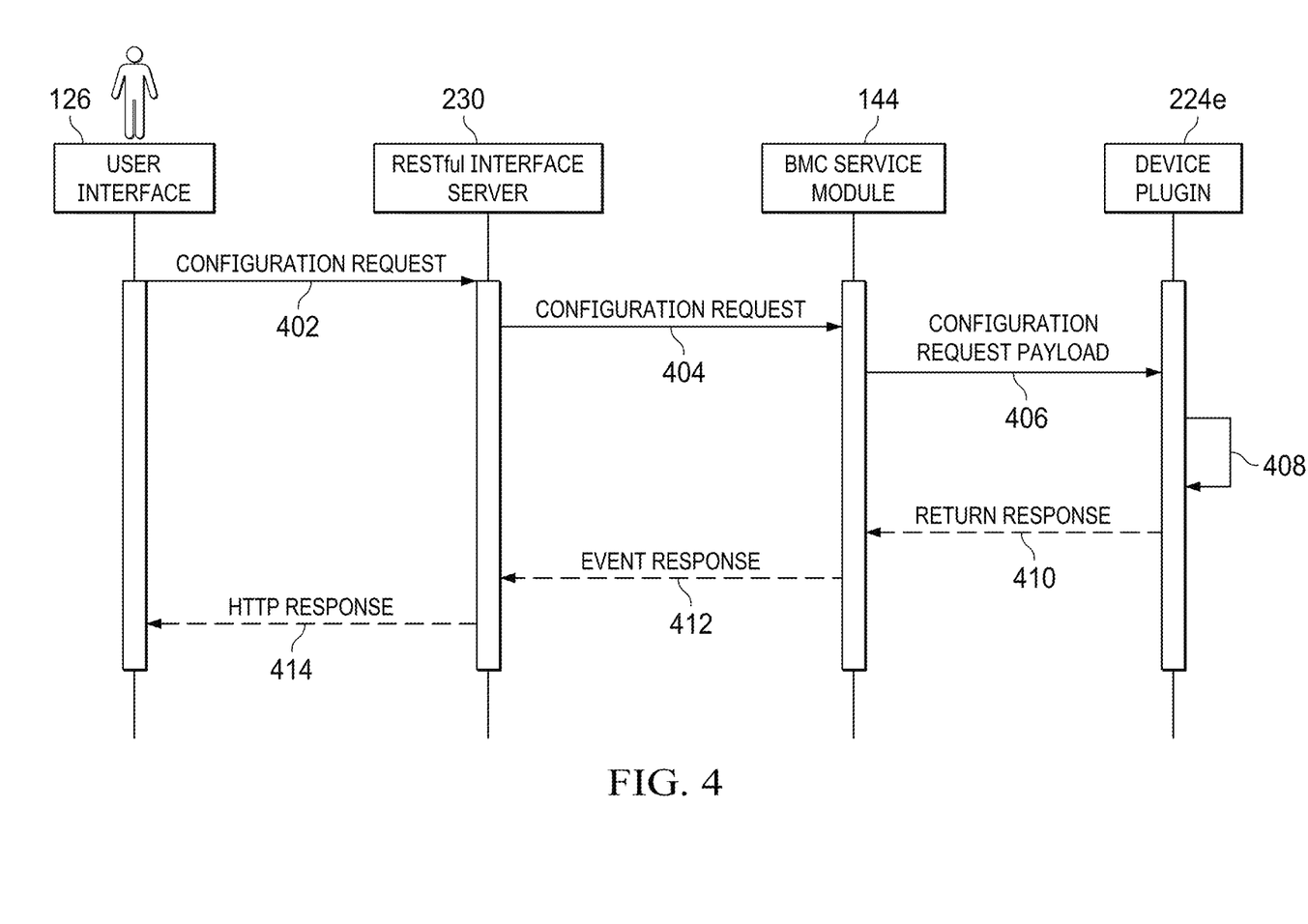
FIG. 4 illustrates a workflow diagram showing a series of actions that may be taken by the system to perform a configuration action on a non-registered hardware device according to one embodiment of the present disclosure.

FIG. 4 illustrates a workflow diagram showing a series of actions that may be taken by the system 200 to perform a configuration action on a non-registered hardware device 206 according to one embodiment of the present disclosure. The configuration action may be any type of allowable actions associated with a non-registered hardware device 206. Examples of such allowable configuration actions may include setting one or more parameters in the non-registered hardware device 206, setting one or more threshold trigger values in the non-registered hardware device 206, reporting frequency of certain parametric values, and the like.

At step 402, user interface 126 issues a configuration request message to RESTful interface server 230. Thereafter at step 404, RESTful interface server 230 forwards the configuration request message to BMC service module 144. In order to initiate a configuration request to device plugin 224c, RESTful interface server 230 may function as a client to forward the request. In one embodiment, RESTful interface server 230 forwards the configuration request message to BMC service module 144 using a sideband management channel 216 comprising a HTTP, version 2 channel protocol. In this manner, the configuration request may be a server sent event (SSE) mechanism of the HTTP, version 2 protocol. In another embodiment, RESTful interface server 230 will send a CSRF token along with the configuration request in order to form a secure connection between BMC 132 and BMC service module 144. Additionally, the RESTful interface client configured on the BMC service module 144 is configured to only accept configuration requests originating from the BMC 132 through the sideband management channel 216. The CSRF token may be used for the transaction so that no other external agent can push configuration actions on Host other than the BMC 132. Once received, the BMC service module 144 parses the configuration request to strip overhead information from the request, and forwards the configuration request payload to the appropriate device plugin 224c at step 406.

At step 408, device plugin 224c performs the requested operation on the non-registered hardware device 206 and when completed, sends a response to the requested operation back to BMC service module 144 at step 410. Thereafter at step 412, BMC service module 144 sends this action response as an event to RESTful interface server 230, which in turn, relays the response back to user interface 126 (e.g, user console) at step 414. If a configuration action is to be staged (e.g., performed at a future point in time) and requires a job, WBEM manager 234 creates the job and returns a job identifier to the user via user interface 126. The status of the job gets updated when BMC service module 144 transmits the status as events.

As can be seen from the foregoing description, configuration requests can be reliably and securely sent to non-registered hardware devices 206 using a RESTful interface, such as a Redfish interface terminal. Additionally, the BMC 132 may use an HTTP, version 2 channel for communicating with the BMC service module 144, which is often natively available with most BMC implementations and is secured from illicit access using a security key, such as a CSRF key as described above. Thus, given these advantages, users may be able to remotely monitor and configure multiple IHSs 100 each having non-registered hardware devices 206 remotely, such as from a system management console 126 in some embodiments.

Figure 5:
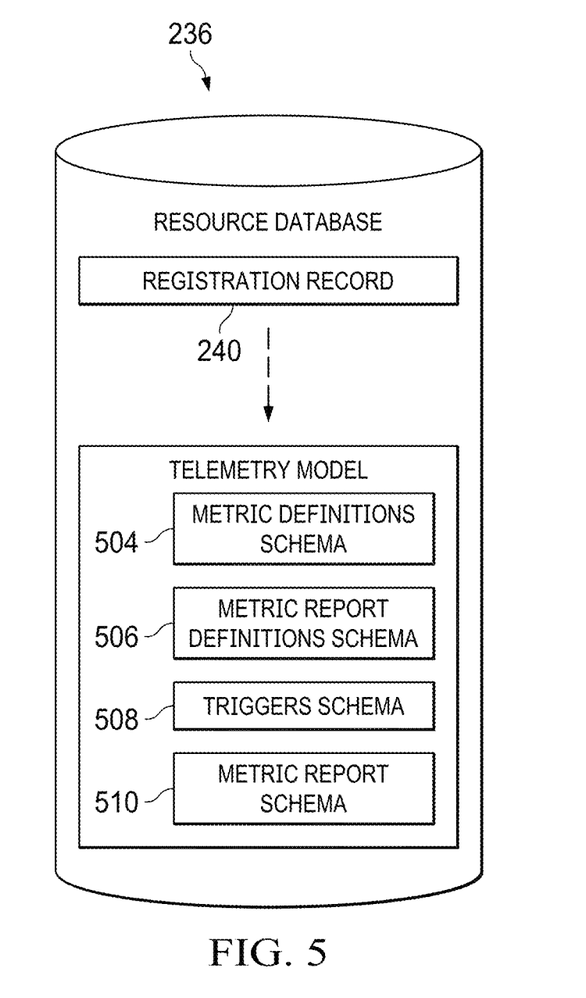
FIG. 5 illustrates several elements of an example data structure for storing configuration data as well as telemetry data associated with a non-registered hardware device according to one embodiment of the present disclosure.

FIG. 5 illustrates several elements of an example data structure for storing configuration data as well as telemetry data associated with a non-registered hardware device 206 according to one embodiment of the present disclosure. According to embodiments of the present disclosure, resource database 236, such as described above with reference to FIG. 3, may include a registration record 240 that is generated when a corresponding device plugin 224c is instantiated on BMC service module 144. Additionally, one or more telemetry model 502 may be generated to provide telemetry reports associated with non-registered hardware devices 206 to BMC 132.

In one embodiment, certain telemetry reports may be generated as a result of an event (e.g., threshold loss of signal strength, overcurrent condition, overheating condition, etc.) that occurs on the non-registered hardware device 206. In other embodiments, certain telemetry reports may be generated periodically to monitor and record one or more parameters (e.g., input voltage, electrical current usage, workload capacity, etc.) as determined by telemetry model 502.

Telemetry model 502 includes a metric definitions schema 504, a metric report definitions schema 506, a triggers schema 508, and one or more metric reports 510. Metric definitions schema 504 includes the definition of metric properties, such as characteristics (e.g., input voltage, capacity usage, etc.), and metadata (e.g., format of data to be stored). Metric report definitions schema 506 includes a definition of metric reports to be generated. For example, definitions included in metric report definitions schema 506 may include a periodicity (how often) a report is generated, and what parameters are to be included in the reports. Metric reports 510 are used for storage of the metric reports. In one embodiment, metric report definitions schema 506 may include information for identifying whether the reports are to be stored (e.g., logged) or not. Triggers schema 508 includes threshold triggers as well as actions that apply to a metric property.

Telemetry model 502 is adapted for providing telemetry reports for non-registered hardware devices 206 configured in IHS 100. In one embodiment, telemetry model 502 may be provided as an extension to (e.g., separate from) another telemetry model (not shown) provided for registered hardware devices. In another embodiment, telemetry model 502 may be integrated with (e.g., use the same database) the telemetry model provided for the registered hardware devices.

The reports may be dynamic based on device plugins 224c that are enabled on the host server O/S 112. That is, the reports will be generated according to configuration information included in the device plugin 224c associated with the non-registered hardware devices 206. Additionally, telemetry model 502 will be instantiated for each non-registered hardware device 206 when its associated device plugin 224c is instantiated with BMC service module 144. That is, for non-registered hardware devices, device plugin 224c will create their own telemetry model 502 to model the properties and create associated metric definitions. The aggregation of data can be provided by device plugin 224c based on periodicity of data collection. BMC service module 144 may read any existing subscription information and the telemetry configuration information stored in BMC 132. An attribute to enable/disable the non-registered hardware device 206 will be provided and based on the presence of the personality module configured in BMC 132.

Although FIG. 5 shows a telemetry model 502 including a metric definitions schema 504, a metric report definitions schema 506, metrics reports 510, and a triggers schema 508, it should be appreciated that the telemetry model 502 may include additional, fewer, or different components (e.g., schemas) than what is shown and described herein. For example, telemetry model 502 may be void of a triggers schema 508 if event driven reports are not needed or desired. Additionally, although the telemetry model 502 is dynamically generated according to information included in its associated device plugin 224c, it should be appreciated that the telemetry model 502 may be statically formed (e.g., non-changing) such that all non-registered hardware devices 206 use the same telemetry schema.

Figure 6:
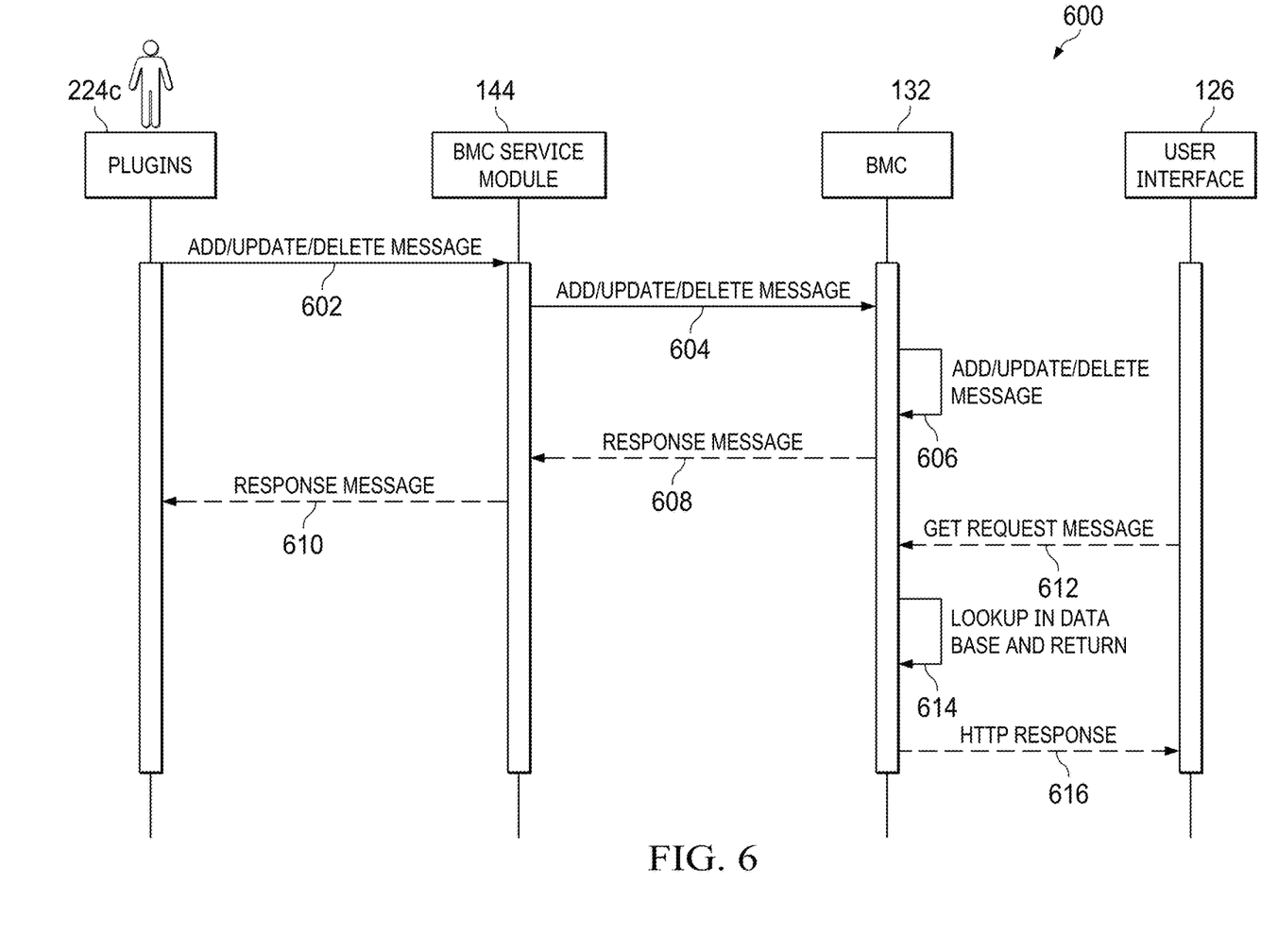
FIG. 6 illustrates a workflow diagram of an example event logging process that may be performed to generate a report, and receive the generated report in response to user input according to one embodiment of the present disclosure.

FIG. 6 illustrates a workflow diagram of an example event logging process 600 that may be performed to generate a report, and receive the generated report in response to a user request according to one embodiment of the present disclosure. Initially, the device plugin 224c associated with a non-registered hardware device 206 has been instantiated on BMC service module 144, and a registration record 240 and associated telemetry model generated in resource database 236.

At step 602, device plugin 224c issues an add/update/delete message to BMC service module 144. For example, the add/update/delete message may include information associated with a threshold parameter that has been exceeded by the non-registered hardware device 206, or a periodically generated message including parametric data associated with the non-registered hardware device 206. In one embodiment, the add/update/delete message is included as at least a part of a RESTful (e.g., Redfish) request message. In another embodiment, the add/update/delete message is transmitted to BMC service module 144 using a BMC service module wrapper; that is, the message is encapsulated using protocol information used by BMC service module 144. Thereafter, BMC service module 144 forwards the add/update/delete message to BMC 132 at step 604. In one embodiment, add/update/delete message may be formatted according to an add/update/delete POST request message. In another embodiment, the communication link between BMC service module 144 and BMC 132 comprises a HTTP, version 2 interface. To provide a secure connection, BMC service module 144 may transmit a CSRF token along with the add/update/delete message so that BMC 132 may recognize and respond to only the add/update/delete message originating from its respective BMC 132.

At step 606, RESTful interface server 230, via WBEM manager 234, stores the message in resource database 236. Once stored, RESTful interface server 230 issues a response message back to BMC service module 144 indicating whether or not the add/update/delete message was successfully received and stored at step 608. In one embodiment, BMC 132 sends the response message as an HTTP status code. At step 610, BMC service module 144 then forwards the response message to device plugin 224c so that it may possess knowledge of whether or not the add/update/delete message was received and logged in resource database 236.

At this point, the add/update/delete message remains persistent in resource database 236. In some embodiments, the logged add/update/delete message may be configured to be persistent for a specified period of time, and then deleted. For example, WBEM manager 234 may delete the add/update/delete message after a specified period of time (e.g., 1 week) has passed. As another example, WBEM manager 234 may delete the add/update/delete message at any suitable time, such as when the non-registered hardware device 206 is physically removed from IHS 100, when another add/update/delete message is received and logged, when another add/update/delete message is received indicating that a threshold event that triggered the initial add/update/delete message has been alleviated (fixed), and the like.

At a later point in time (e.g., after step 606), user interface 126 issues a GET request message to RESTful interface server 230. The GET request message generally includes information for retrieving information stored in resource database 236 that is associated with a particular non-registered hardware device 206. For example, the GET request message may be generated according to user input in which the GET request message identifies a particular non-registered hardware device 206. BMC 132 then obtains the logged information stored in the resource database 236 at step 614, and transmits an HTTP response message including the information back to the user interface 126. In one embodiment, the GET request message and HTTP response message may be formatted according to a Redfish interface.

Thus, as can be seen, device plugin 224c may be used to continually monitor the activities of its associated non-registered hardware device 206, and report the activities in a manner such that users can obtain a historical view of the non-registered hardware device's activities at any desired time. Additionally, reports logged (stored) for non-registered hardware devices 206 can also be combined with those of registered hardware devices to provide an overall view of most or all hardware devices configured in IHS 100. For example, reports may be obtained from all hardware devices (e.g., registered hardware devices as well as non-registered hardware devices 206) to determine whether electrical power produced by PSUs 130 is sufficient for all of the electrical power consumed by those hardware devices.

Figure 7:
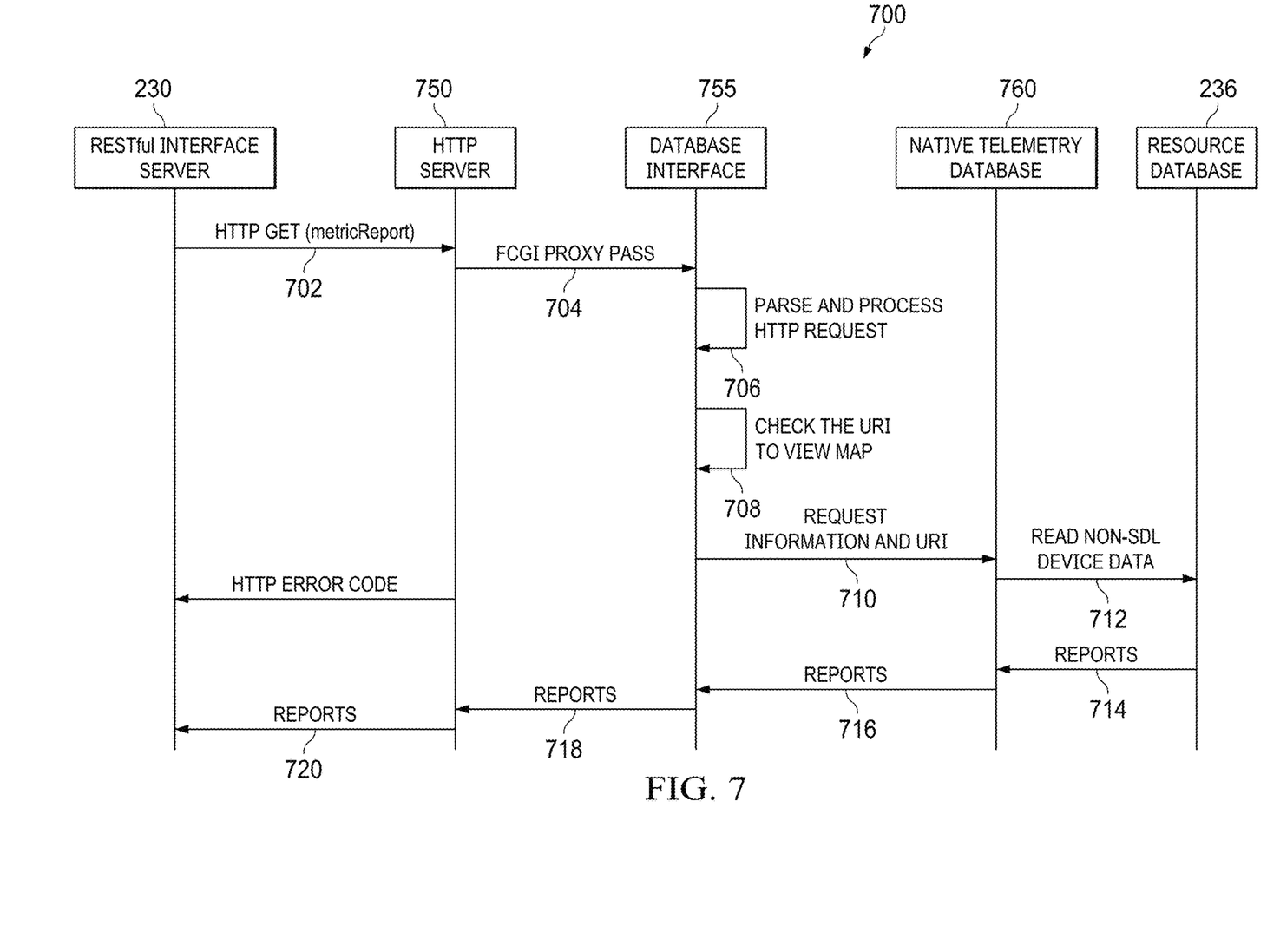
FIG. 7 illustrates a workflow diagram of an event log report retrieval process that may be performed by the system according to one embodiment of the present disclosure.

FIG. 7 illustrates a workflow diagram of an event log report retrieval process 700 that may be performed by the system 200 according to one embodiment of the present disclosure. The event log retrieval process 700 includes several details associated with steps 612-616 of the event logging process 600 described above with reference to FIG. 6. The process 700 uses an HTTP server 750, a database interface 755, and a native telemetry database 760 that are stored in a memory and executed on a processor configured in BMC 132. Details associated with HTTP server 750, database interface 755, and telemetry database 700 will be discussed in detail herein below.

Initially at step 702, RESTful interface server 230 issues a HTTP GET request message to a HTTP server 750 (e.g., Apache™ HTTP server) process executed on BMC 132. The HTTP server 750 may be beneficial due to its ability to serialize and coordinate HTTP requests with their associated responses, particularly when those requests may be received from multiple, different clients over a communication network, such as the Internet. The HTTP server 750 then forwards the HTTP GET request to a database interface 755, such as a fast common gateway interface (fCGI) at step 704. Nevertheless, the database interface 755 may be any suitable type that interfaces interactive programs, such as a SQL database, with a web server (e.g., Apache web server).

At step 706, the database interface 755 parses the HTTP GET request to derive binary request information suitable for accessing event log data from resource database 236. Next, the database interface 755 obtains the universal resource indicator (URI) included in the GET request to identify the particular non-registered hardware device 206 involved with the HTTP GET request at step 708, and transmits the binary request information to a native telemetry database 760 configured in BMC 132 at step 710. The native telemetry database 760 may be configured in BMC 132 to to store information associated with registered hardware devices 204. Additionally, the native telemetry database 760 may be one that is adapted for storing and managing registered hardware devices in IHS 100. That is, the native telemetry database may include telemetry logs associated with those hardware devices that are registered in the BIOS of IHS 100.

At step 712, native telemetry database 760, upon identifying that the address (e.g., URI) is not associated with any of its records, forwards the binary request information and URI to resource database 236, which is also configured in BMC 132. Resource database 236 recognizes that the URI is associated with one of its records, and as such, retrieves telemetry data that has been stored for that non-registered hardware device 206, and transmits a response message including one or more reports back to native telemetry database 760 at step 714. The native telemetry database 760 then formats the reports according to a Javascript Object Notation (JSON) format, and forwards the reports to the database interface 755 at step 716. At step 718, database interface 755 forwards the JSON formatted reports to the HTTP server 750, which in turn, forwards the JSON formatted reports to the RESTful interface server 230 that issued the HTTP GET request message.

As can be seen from the foregoing disclosure, a resilient event log report retrieval process 700 may be provided that can handle multiple requests from different users, and is resilient against inherent communication limitations commonly experienced in many data communication networks, such as the Internet. Additionally, because the request information is initially transmitted to the native telemetry database 760, proper verification checks can be performed to ensure that the request message is forwarded to the database where the requested reports are stored.

The process described above may be repeatedly performed each time the electrical power provided by power supply units 102 to IHS 100, or cooling provided by fans 136 to IHS 100 is to be optimized. Nevertheless at step 322, the process ends.

Although FIG. 7 describes one example of a process that may be performed by BMC 132 for obtaining data associated with non-registered hardware devices 206 in IHS 100, the features of the disclosed process may be embodied in other specific forms without deviating from the spirit and scope of the present disclosure. For example, the process 700 may perform additional, fewer, or different operations than those operations as described in the present example. As another example, the steps of the process described herein may be performed by a computing system other than BMC 132, such as by processing units 102 configured on IHS 100.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a plurality of hardware devices; and
a Baseboard Management Controller (BMC) in communication with the plurality of hardware devices, the BMC including:
a baseboard processor; and
baseboard memory including baseboard instructions that, upon execution by the baseboard processor, cause the BMC to:
receive a message associated with a non-registered hardware device that is not registered to be managed by the BMC, wherein hardware device data for the non-registered device does not exist in the IHS, the message formatted according to a native protocol of the BMC; <transmit the message to a device plugin associated with the non-registered hardware device, wherein the device plugin comprises custom instructions that, upon execution by a system processor, cause the IHS to:
convert the message into a protocol associated with the non-registered hardware device;
forward the converted message to the non-registered hardware device using the protocol of the non-registered hardware device;
obtain configuration information from the device plugin, the configuration information comprising one or more telemetry parameters to be obtained from the non-registered hardware device; and
generate telemetry reports associated with the non-registered hardware device using the configuration information stored in the device plugin.

2. The IHS of claim 1, wherein the instructions further cause the BMC to transmit the message to the device plugin using a secure Hypertext Transfer Protocol (HTTP), version 2 channel.

3. The IHS of claim 2, wherein the instructions further cause the BMC to secure the HTTP, version 2 channel using a CSRF (cross site request forgery) token.

4. The IHS of claim 2, wherein the device plugin is restricted to only acting on the message when received through the HTTP, version 2 channel.

5. The IHS of claim 1, wherein the device plugin comprises an applications program interface (API) of a BMC service module executed on the IHS.

6. The IHS of claim 1, wherein the baseboard instructions further cause the BMC to:
determine that the non-registered hardware device is not enrolled for use with the BMC;
enroll the non-registered hardware device for use with the BMC by storing information associated with the non-registered hardware device in the baseboard memory; and
remotely manage the non-registered hardware device by generating the message through a RESTful interface.

7. The IHS of claim 6, wherein the baseboard instructions further cause the BMC to:
determine that the received message comprises an industry standards organization modeled action, the industry standards organization associated with a RESTful interface from which the received message has been obtained;
determine that the message is not enrolled for use by the first non-registered hardware device;
enroll the message for use with the non-registered hardware device; and
remotely manage the non-registered hardware device by generating the enrolled message through the RESTful interface.

8. The IHS of claim 1, wherein the baseboard instructions further cause the BMC to:
receive one or more event messages from the non-registered hardware device;

store the one or more event messages in the baseboard memory; and transmit the one or more event messages to a RESTful interface in communication with the BMC in response to a request received from the RESTful interface.

9. The IHS of claim 8, wherein the baseboard instructions further cause the BMC to control a periodicity of how often the one or more messages are stored in the baseboard memory.

10. The IHS of claim 8, wherein the event messages comprise information associated with one or more parameters of the non-registered hardware device, and wherein the baseboard instructions further cause the BMC to determine a subset of the one or more parameters to be monitored by the BMC, and store the information associated with subset of parameters in the baseboard memory.

11. A method comprising:
receiving, using instructions stored in at least one memory and executed by at least one processor, a message associated with a non-registered hardware device that is not registered to be managed by a Baseboard Management Controller (BMC), wherein hardware device data for the non-registered device does not exist in an Information Handling System (HIS) (IHS) in which the non-registered hardware device is configured, the message formatted according to a native protocol of the BMC, the BMC in communication with a plurality of hardware devices comprising the non-registered hardware device; and
transmitting, using the instructions, the message to a device plugin associated with the non-registered hardware device, wherein the device plugin comprises:
converting, using the instructions, the message into a protocol associated with the non-registered hardware device;
forwarding, using the instructions, the converted message to the non-registered hardware device using the protocol of the non-registered hardware device;
obtaining configuration information from the device plugin, the configuration information comprising one or more telemetry parameters to be obtained from the non-registered hardware device; and
generating, using the instructions, telemetry reports associated with the non-registered hardware device using the configuration information stored in the device plugin.

12. The method of claim 11, further comprising:
determining that the non-registered hardware device is not enrolled for use with the BMC;
enrolling the non-registered hardware device for use with the BMC by storing information associated with the non-registered hardware device in the baseboard memory; and
remotely managing the non-registered hardware device by generating the message through a RESTful interface.

13. The method of claim 12, further comprising:
determining that the received message comprises an industry standards organization modeled action, the industry standards organization associated with a RESTful interface from which the received message has been obtained;
determining that the message is not enrolled for use by the first non-registered hardware device;
enrolling the message for use with the non-registered hardware device; and
remotely managing the non-registered hardware device by generating the enrolled message through the RESTful interface.

14. The method of claim 11, further comprising:
receiving one or more event messages from the non-registered hardware device;
storing the one or more event messages in the baseboard memory; and
transmitting the one or more event messages to a RESTful interface in communication with the BMC in response to a request received from the RESTful interface.

15. The method of claim 14, further comprising controlling a periodicity of how often the one or more messages are stored in the baseboard memory.

16. The method of claim 14, wherein the event messages comprise information associated with one or more parameters of the non-registered hardware device, wherein the method further comprises determining a subset of the one or more parameters to be monitored by the BMC, and storing the information associated with the subset of parameters in the baseboard memory.

17. One or more computer-readable storage devices having instructions stored thereon for providing remote management of an IHS (Information Handling System), wherein execution of the instructions by one or more processors of the IHS causes the one or more processors to:
receive a message associated with a non-registered hardware device that is not registered to be managed by a Baseboard Management Controller (BMC), wherein hardware device data for the non-registered device does not exist in the IHS, the message formatted according to a native protocol of the BMC, the BMC in communication with a plurality of hardware devices comprising the non-registered hardware device; and
transmit the message to a device plugin associated with the non-registered hardware device, wherein the device plugin comprises custom instructions that, upon execution by a system processor, cause the IHS to:
convert the message into a protocol associated with the non-registered hardware device;
forward the converted message to the non-registered hardware device using the protocol of the non-registered hardware device;
obtain configuration information from the device plugin, the configuration information comprising one or more telemetry parameters to be obtained from the non-registered hardware device; and
generate telemetry reports associated with the non-registered hardware device using the configuration information stored in the device plugin.

18. The storage devices of claim 17, wherein the instructions further cause the BMC to:
determine that the non-registered hardware device is not enrolled for use with the BMC;
enroll the non-registered hardware device for use with the BMC by storing information associated with the non-registered hardware device in the baseboard memory; and
remotely manage the non-registered hardware device by generating the message through a RESTful interface.

19. The storage devices of claim 18, wherein the instructions further cause the BMC to:
determine that the received message comprises an industry standards organization modeled action, the industry standards organization associated with a RESTful interface from which the received message has been obtained;

determine that the message is not enrolled for use by the first non-registered hardware device;

enroll the message for use with the non-registered hardware device; and remotely manage the non-registered hardware device by generating the enrolled message through the RESTful interface.

20. The storage devices of claim 17, wherein the instructions further cause the BMC to:

receive one or more event messages from the non-registered hardware device;

store the one or more event messages in the baseboard memory; and transmit the one or more event messages to a RESTful interface in communication with the BMC in response to a request received from the RESTful interface.

* * * * *

UNITED STATES PATENT AND TRADEMARK OFFICE
CERTIFICATE OF CORRECTION

| | |
|---|---|
| PATENT NO. | : 11,847,082 B2 |
| APPLICATION NO. | : 17/069161 |
| DATED | : December 19, 2023 |
| INVENTOR(S) | : Chandrasekhar Puthillathe et al. |

It is certified that error appears in the above-identified patent and that said Letters Patent is hereby corrected as shown below:

In the Claims

In Column 14 Line 9, Claim 1, delete "the BMC; <transmit the message to a device plugin" and insert --the BMC; transmit the message to a device plugin-- therefor.

In Column 15 Line 24, Claim 11, delete "Information Handling System (HIS) (IHS) in which the" and insert --Information Handling System (IHS) in which the-- therefor.

Signed and Sealed this
Twenty-third Day of January, 2024

Katherine Kelly Vidal
*Director of the United States Patent and Trademark Office*